(12) United States Patent
Wagner et al.

(10) Patent No.: US 12,449,322 B2
(45) Date of Patent: Oct. 21, 2025

(54) SENSOR ASSEMBLY

(71) Applicant: TE Connectivity Solutions GmbH, Schaffhausen (CH)

(72) Inventors: Dave Eric Wagner, Fremont, CA (US); Vincent Wong, Fremont, CA (US); Cuong Nguyen, Fremont, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 310 days.

(21) Appl. No.: 18/295,949

(22) Filed: Apr. 5, 2023

(65) Prior Publication Data

US 2024/0337551 A1  Oct. 10, 2024

(51) Int. Cl.
*G01L 13/02* (2006.01)
*G01L 19/14* (2006.01)

(52) U.S. Cl.
CPC ............ *G01L 13/025* (2013.01); *G01L 19/14* (2013.01)

(58) Field of Classification Search
CPC ....... G01L 13/00; G01L 13/02; G01L 13/025; G01L 19/00; G01L 19/14
See application file for complete search history.

(56) References Cited

U.S. PATENT DOCUMENTS

| | | | |
|---|---|---|---|
| 6,038,927 A * | 3/2000 | Karas | ................... G01L 19/147 73/706 |
| 7,013,735 B2 | 3/2006 | Miyazawa | |
| 9,562,796 B2 | 2/2017 | Lull | |
| 11,073,846 B2 | 7/2021 | Lull et al. | |

* cited by examiner

*Primary Examiner* — Nguyen Q. Ha

(57) ABSTRACT

A sensor assembly includes a sensor and an adapter connected to the sensor. The sensor includes a housing having a port and a cavity, a diaphragm disposed in the port and enclosing the cavity, and a sensing die disposed in the cavity. The diaphragm extends in a first plane. The adapter has a base section connected to the housing and an end section extending from the base section. The end section has a mating face that extends in a second plane perpendicular to the first plane. The mating face is attached to a manifold or a surface of a structure in which a pressure of a fluid medium is sensed by the sensor assembly. The adapter has an adapter passageway extending from the mating face through the base section of the adapter that connects the mating face to the port of the housing.

21 Claims, 6 Drawing Sheets

SENSOR ASSEMBLY

FIELD OF THE INVENTION

The present invention relates to a sensor assembly and, more particularly, to a sensor assembly including a sensor with a diaphragm.

BACKGROUND

A pressure sensor commonly has a housing and a diaphragm attached to the housing. An oil is disposed within passageways of the housing and a sensing die is disposed in the housing within the oil. When an external pressure is applied to the diaphragm, the diaphragm deflects, transferring the external pressure to the oil surrounding the die, which imparts the same external pressure to the die. The die deflects in accordance with the external pressure to generate an electrical signal representative of the external pressure.

As the size of the diaphragm increases, the diaphragm becomes less rigid, and can absorb an increase in oil volume due to a temperature change with less change in internal pressure; large diaphragms are used in sensors that require better performance in low pressure range applications. Modern applications of these pressure sensors, however, for example in mass flow controllers, require a thin sensor thickness in order to decrease the overall footprint of one or multiple sensors grouped together. Pressure sensors having diaphragms in low pressure range applications thus suffer from decreased performance due to limitations on the maximum diaphragm size dictated by the maximum permissible thickness of the sensor.

SUMMARY

A sensor assembly includes a sensor and an adapter connected to the sensor. The sensor includes a housing having a port and a cavity, a diaphragm disposed in the port and enclosing the cavity, and a sensing die disposed in the cavity. The diaphragm extends in a first plane. The adapter has a base section connected to the housing and an end section extending from the base section. The end section has a mating face that extends in a second plane perpendicular to the first plane. The mating face is attached to a manifold or a surface of a structure in which a pressure of a fluid medium is sensed by the sensor assembly. The adapter has an adapter passageway extending from the mating face through the base section of the adapter that connects the mating face to the port of the housing.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
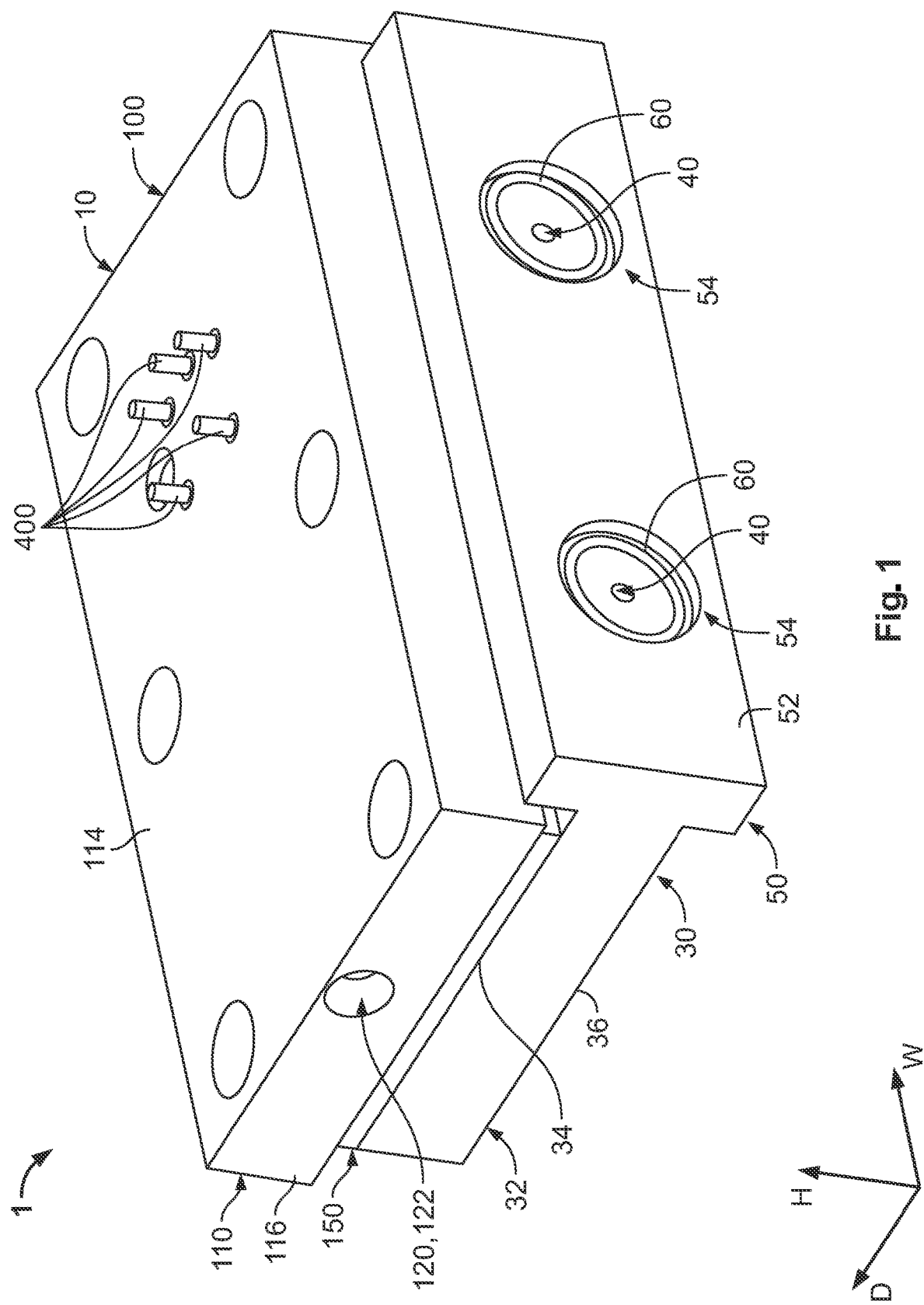
FIG. 1 is a perspective view of a sensor assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "height direction", "depth direction", and "width direction". These descriptors are merely for clarity of the description and for differentiation of the various directions. These directional descriptors do not imply or require any particular orientation of the disclosed elements.

A sensor assembly 1 according to an embodiment is shown in FIG. 1. The sensor assembly 1 includes a sensor 10 and an adapter 30 attached to the sensor 10.

Figure 2:
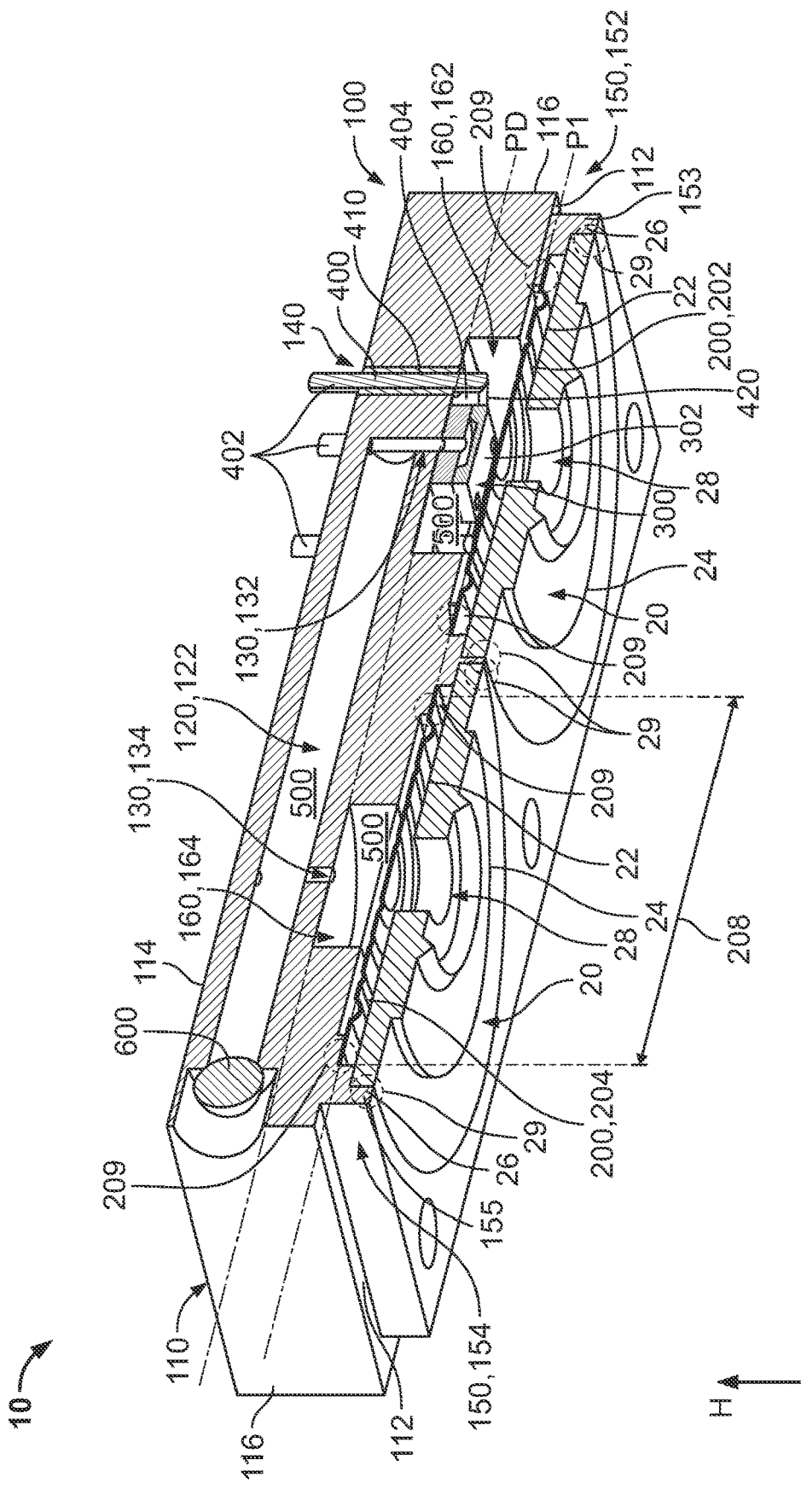
FIG. 2 is a sectional perspective view of a sensor of the sensor assembly.

The sensor 10, as shown in FIG. 2, includes a housing 100, a plurality of diaphragms 200 disposed in the housing 100, a die 300 disposed in the housing 100, and a plurality of pins 400 extending through the housing 100.

The housing 100 includes a body 110, as shown in FIG. 2, having a first face 112 and a second face 114 opposite the first face 112 in a height direction H. The body 110 has a plurality of sidewalls 116 connecting the first face 112 and the second face 114. In the shown embodiment, the sidewalls 116 form an approximately rectangular shape of the body 110. In other embodiments, the body 110 could have a different polygonal shape formed by the sidewalls 116.

As shown in FIG. 2, the housing 100 has a plurality of passageways 120 which include a main passageway 112 extending from one of the sidewalls 116 and partially through the body 110. The main passageway 122 extends in a width direction W perpendicular to the height direction H through one of the sidewalls 116.

The passageways 120 also include a plurality of cavity passageways 130, shown in FIG. 2, extending from the main passageway 122. In the shown embodiment, the cavity passageways 130 extend in the height direction H perpendicular to the main passageway 122. The cavity passageways 130, in the embodiment shown in FIG. 2, include a first cavity passageway 132 extending from an end of the main passageway 122 opposite the sidewall 116 through which the main passageway 122 enters and a second cavity passageway 134 extending from the main passageway 122 between the first cavity passageway 132 and the sidewall 116 through which the main passageway 122 enters.

As shown in FIG. 2, the passageways 120 also include a plurality of pin passageways 140 extending through the body 110. The pin passageways 140 extend through the second face 114 in the height direction H. The pin passageways 140, in the shown embodiment, are positioned adjacent to the end of the main passageway 122 and do not intersect with the main passageway 122.

As shown in FIG. 2, the housing 100 has a plurality of ports 150 extending from the body 110. The ports 150, in the shown embodiment, include a first port 152 having a first wall 153 extending from the first face 112 of the body 110 in the height direction H and a second port 154 having a second wall 155 extending from the first face 112 of the body 110 in the height direction H. In the shown embodiment, the first wall 153 and the second wall 155 are coextensive and formed in a single wall between the first port 152 and the second port 154 in the width direction W. In another embodiment, the first wall 153 and the second wall 155 could be separated from one another along the width direction W to define discrete ports 152, 154 protruding from the body 110.

The housing 100 has a plurality of cavities 160. In the embodiment shown in FIG. 2, the cavities 160 include a first cavity 162 disposed in the first port 152 and a second cavity 164 disposed in the second port 154. The cavities 160 are openings in the housing 100 that extend into the body 110. The first cavity passageway 132 connects the main passageway 122 to the first cavity 162 and the second cavity passageway 134 connects the main passageway 122 to the second cavity 164. The pin passageways 140 in the shown embodiment extend from the second face 114 of the body 110 in the height direction H into the first cavity 162.

In the shown embodiment, the housing 100 is monolithically formed in a single piece from a metal material. In another embodiment, the housing 100 can be formed from a plurality of pieces and assembled together to form the elements of the housing 100 described above. In other embodiments, the housing 100 may be formed of conductive materials other than metal, or may be formed of a non-conductive material.

As shown in FIG. 2, the diaphragms 200 are disposed in the ports 150 of the housing 100. The diaphragms 200 are each formed of a resiliently flexible material. The resiliently flexible material of the diaphragms 200 may be a thin metal material, such as stainless steel, or may be other conductive or non-conductive flexible materials capable of transmitting force as described in greater detail below. The diaphragms 200 may be planar elements or, as in the shown embodiment, may have a corrugated cross-sectional shape.

The diaphragms 200 each have a diameter 208, as shown in FIG. 2, in a plane that includes the width direction W and a depth direction D, the depth direction D perpendicular to the width direction W and the height direction H. The diameter 208, in an embodiment, is greater than 8 mm. In other embodiments in which the diaphragms 200 may have a shape other than a circular shape, such as a square shape or another polygonal shape, the diameter 208 represents a maximum outer dimension of the diaphragm 200.

In the embodiment shown in FIG. 2, the diaphragms 200 include a first diaphragm 202 disposed in the first port 152 and a second diaphragm 204 disposed in the second port 154. The first diaphragm 202 is attached to the first wall 153 of the first port 152 and encloses first cavity 162. The second diaphragm 204 is attached to the second wall 155 of the second port 154 and encloses the second cavity 164. The diaphragms 202, 204 may be attached to the walls 153, 155 by a first weld 209 or by any other form of attachment. The first weld 209 may be a laser weld, a resistance weld, or any other type of weld. As shown in FIG. 2, the first diaphragm 202 and the second diaphragm 204 are coplanar with one another in a first plane P1.

The die 300, as shown in FIG. 2, is disposed in the first cavity 162 and attached to the body 110 of the housing 100. The die 300 is a piezoelectric pressure sensor and has a first membrane 302 in the shown embodiment that is resiliently deflectable in accordance with pressures on opposite sides of the first membrane 302. The die 300 is attached to the housing 100 along a die plane PD that is parallel to the first plane P1.

As shown in FIG. 2, the pins 400 are each disposed in one of the pin passageways 140 and each extend from a first end 402 outside the housing 100 to an opposite second end 404 disposed in the first cavity 162. The pins 400 are formed from an electrically conductive material, such as a metal alloy with nickel and/or gold. The second end 404 of each of the pins 400 is electrically connected to the die 300 in the first cavity 162 by a wirebond 420.

The pins 400, as shown in FIG. 2, each have a pin seal 410 disposed around the pins 400 in the pin passageways 140. The pin seal 410 hermetically seals the pins 400 in the pin passageways 140 to the housing 100. The pin seal 410, in an embodiment, is a glass material that forms a glass-to-metal bond with the housing 100 and the pins 400.

The sensor 10 is filled with an oil 500 in the main passageway 122, the cavity passageways 130, and the cavities 160. The oil 500 is held in the cavities 160 by the diaphragms 200 attached to the ports 150. Once the oil 500 has been filled in the main passageway 122, the cavity passageways 130, and the cavities 160, a passageway seal 600 is positioned in an end of the main passageway 122 adjacent to the sidewall 116 to retain and seal the oil 500 in the sensor 10, as shown in FIG. 2. The passageway seal 600, in an embodiment, is a glass material that forms a glass-to-metal bond with the housing 100. In other embodiments, a different non-compressible liquid may be used in place of the oil 500.

As shown in FIG. 2, the sensor assembly 1 may include a plurality of body seals 20 disposed in the ports 150 of the housing 100 and attached to the housing 100. Each of the body seals 20 has a first surface 22 and a second surface 24 opposite the first surface 22 in the height direction H. The body seals 20 each have an outer perimeter 26 and a central passageway 28 extending through the body seal 20. The body seals 20 are each a circular member in the shown embodiment, but could be any shape that matches a shape of the ports 150 in the housing 100.

The body seals 20, as shown in FIG. 2, are disposed in the ports 150 on a side of the diaphragms 200 opposite the cavities 160. In an embodiment, the body seals 20 are each formed of a metal material. In this embodiment, as shown in FIG. 2, the first surface 22 of each of the body seals 20 is seated in one of the ports 150 and the outer perimeter 26 of each of the body seals 20 is welded to the wall 153, 155 of the respective port 152, 154 at a second weld 29. The second surfaces 24 of the body seals 20 are flush with outer surfaces of the walls 153, 155 in the height direction H in this embodiment. The second weld 29 may be a laser weld, a resistance weld, or any other type of weld. In other embodiments, the body seals 20 may be an elastomeric material, such as an O-ring, or may be another type of compressible metal material, such as a W-ring, a C-ring, an E-ring, or any type of sealing element that can be attached to the ports 150 of the housing 100 and can form a hermetic seal with a machined surface as described below.

Figure 3:
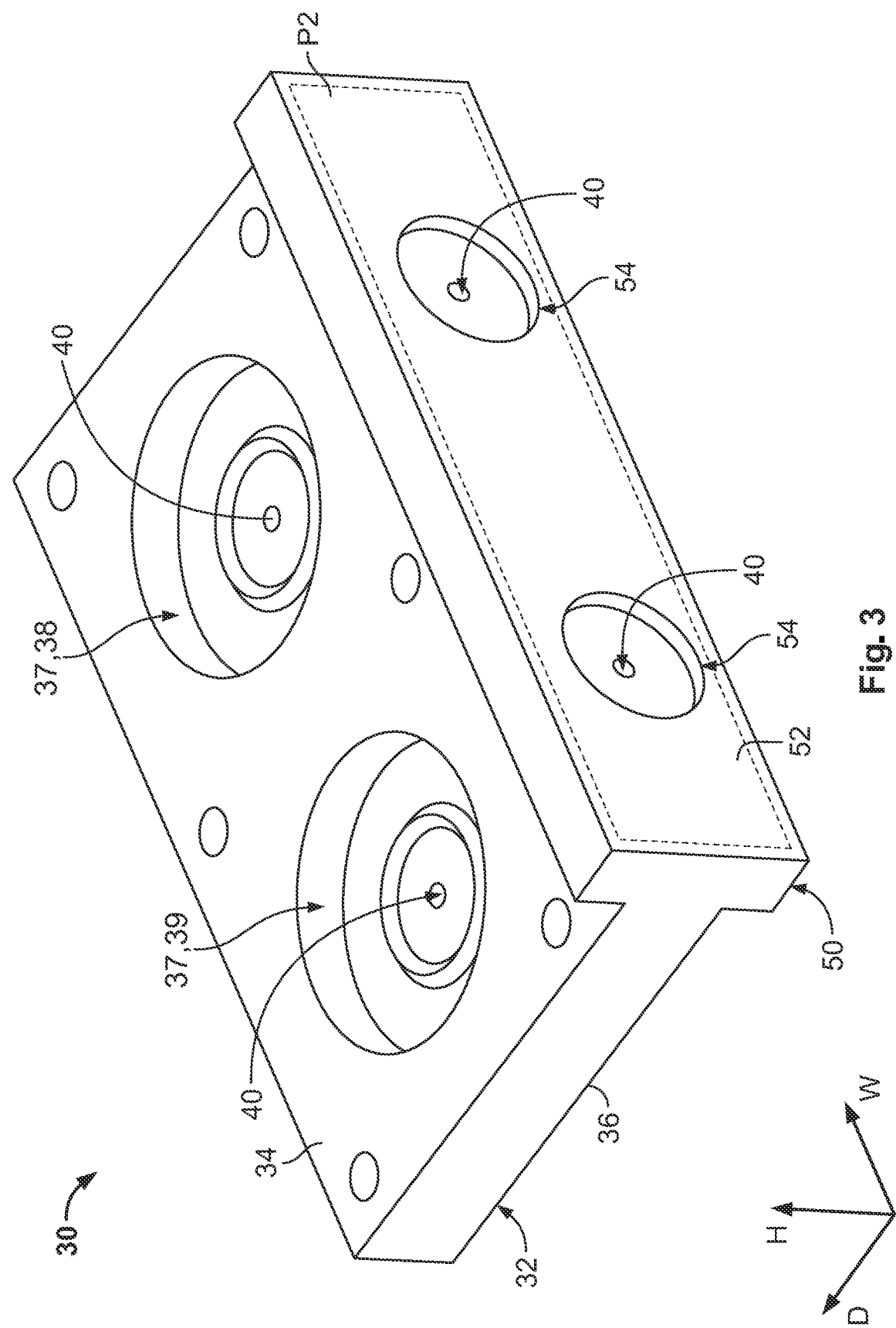
FIG. 3 is a perspective view of an adapter of the sensor assembly.
Figure 4:
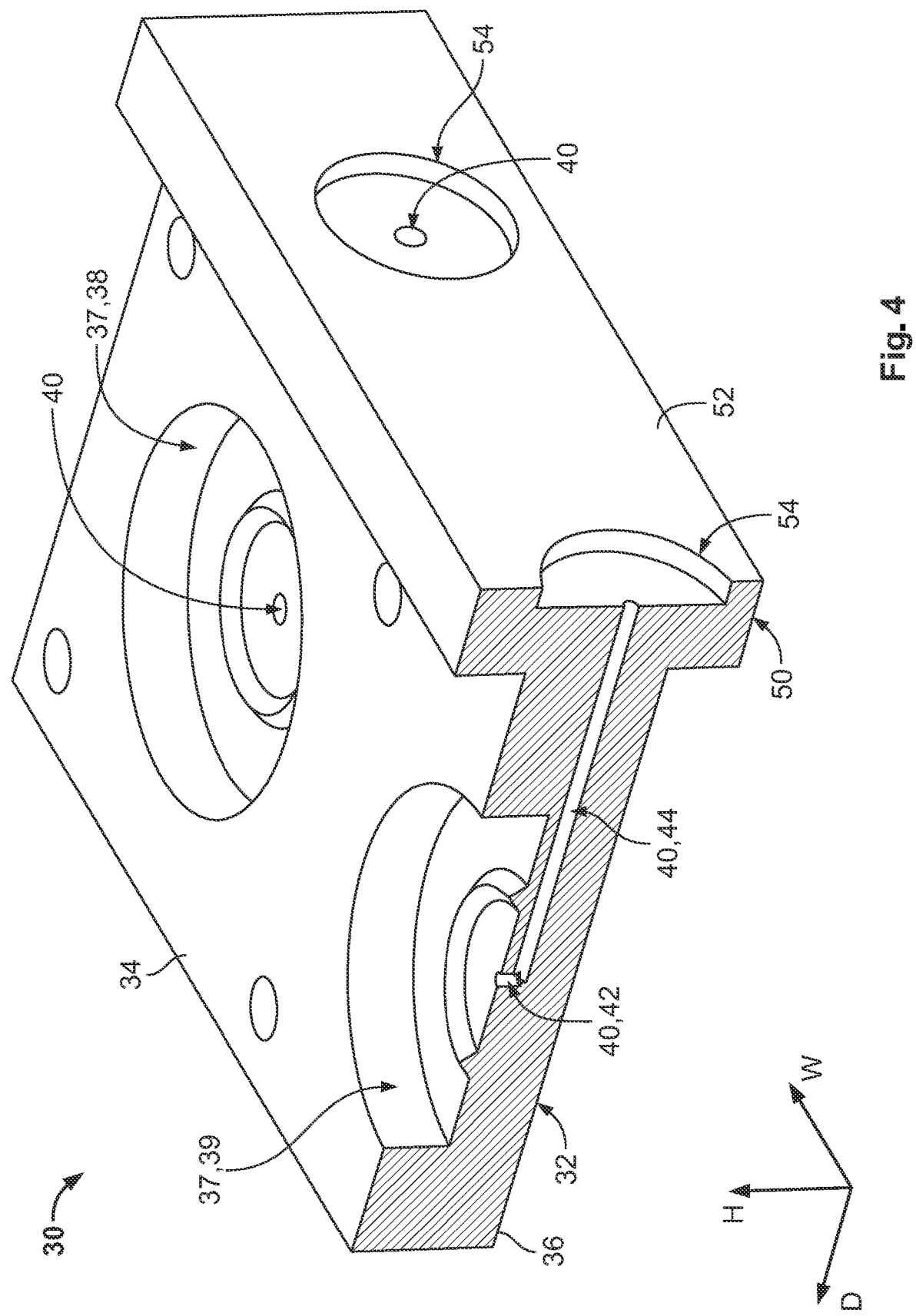
FIG. 4 is a sectional perspective view of the adapter.

The adapter 30, as shown in FIGS. 1, 3, and 4, has a base section 32 and an end section 50 extending from the base section 32.

The base section 32, as shown in FIGS. 3 and 4, has an interior surface 34 and an exterior surface 36 opposite the interior surface 34 in the height direction H. The base section 32 has a plurality of chambers 37 extending into the interior surface 34. The number of chambers 37 corresponds to the number of ports 150 of the housing 100; in the shown embodiment, the base section 32 has a first chamber 38 and a second chamber 39 extending into the interior surface 34. The first chamber 38 and the second chamber 39 are recessed into the interior surface 34 of the base section 32 and are separated from one another in the width direction W.

As shown in FIGS. 1, 3, and 4, the end section 50 is positioned at an end of the base section 32 in the depth direction D. The end section 50 forms a flange on the base section 32. In the shown embodiment, the end section 50 has a same width as the base section 32 in the width direction W but protrudes beyond the interior surface 34 and the exterior surface 36 of the base section 32 in the height direction H. In another embodiment, the end section 50 can have a same height as the base section 32 in the height direction H and can protrude beyond the sides of the base section 32 in the width direction W. In a further embodiment, the end section 50 could protrude beyond the base section 32 in both the height direction H and the width direction W.

The end section 50 has a mating face 52 extending in a second plane P2, shown in FIG. 3, defined by the height direction H and the width direction W. The mating face 52 in the second plane P2 is perpendicular to the interior surface 34 and the exterior surface 36 of the base section 32. The end section 50 has a pair of recesses 54 extending into the mating face 52. The recesses 54 have circular shapes in the shown embodiment but could have other shapes, such as a square shape, in other embodiments.

A plurality of adapter passageways 40 extend through the adapter 30, as shown in FIGS. 3 and 4. The adapter passageways 40 connect the mating face 52 with the chambers 37 of the adapter 30. As shown in FIG. 4, the adapter passageways 40 each have a first portion 42 extending from the interior surface 34 at one of the chambers 37 in the height direction H parallel to the second plane P2 and a second portion 44 extending from the first portion 42 in the depth direction D to the mating face 52. The second portion 44 is perpendicular to the first portion 42. In the shown embodiment, the second portion 44 of each of the adapter passageways 40 ends in one of the recesses 54 at the mating face 52.

In the shown embodiment, the adapter 30 is monolithically formed in a single piece from a metal material. In another embodiment, the adapter 30 can be formed from a plurality of pieces and assembled together to form the elements of the adapter 30 described above. In other embodiments, the adapter 30 may be formed of conductive materials other than metal, or may be formed of a non-conductive material.

As shown in the embodiment of FIG. 1, the sensor assembly 1 includes an adapter seal 60 disposed in each of the recesses 54 of the mating face 52 and surrounding the adapter passageway 40. The adapter seal 60 is elastically compressible and may be an elastomeric material, such as an O-ring, or may be a metal material, such as a W-ring, a C-ring, an E-ring, or any type of sealing element that can form a hermetic seal with a machined surface.

Figure 5:
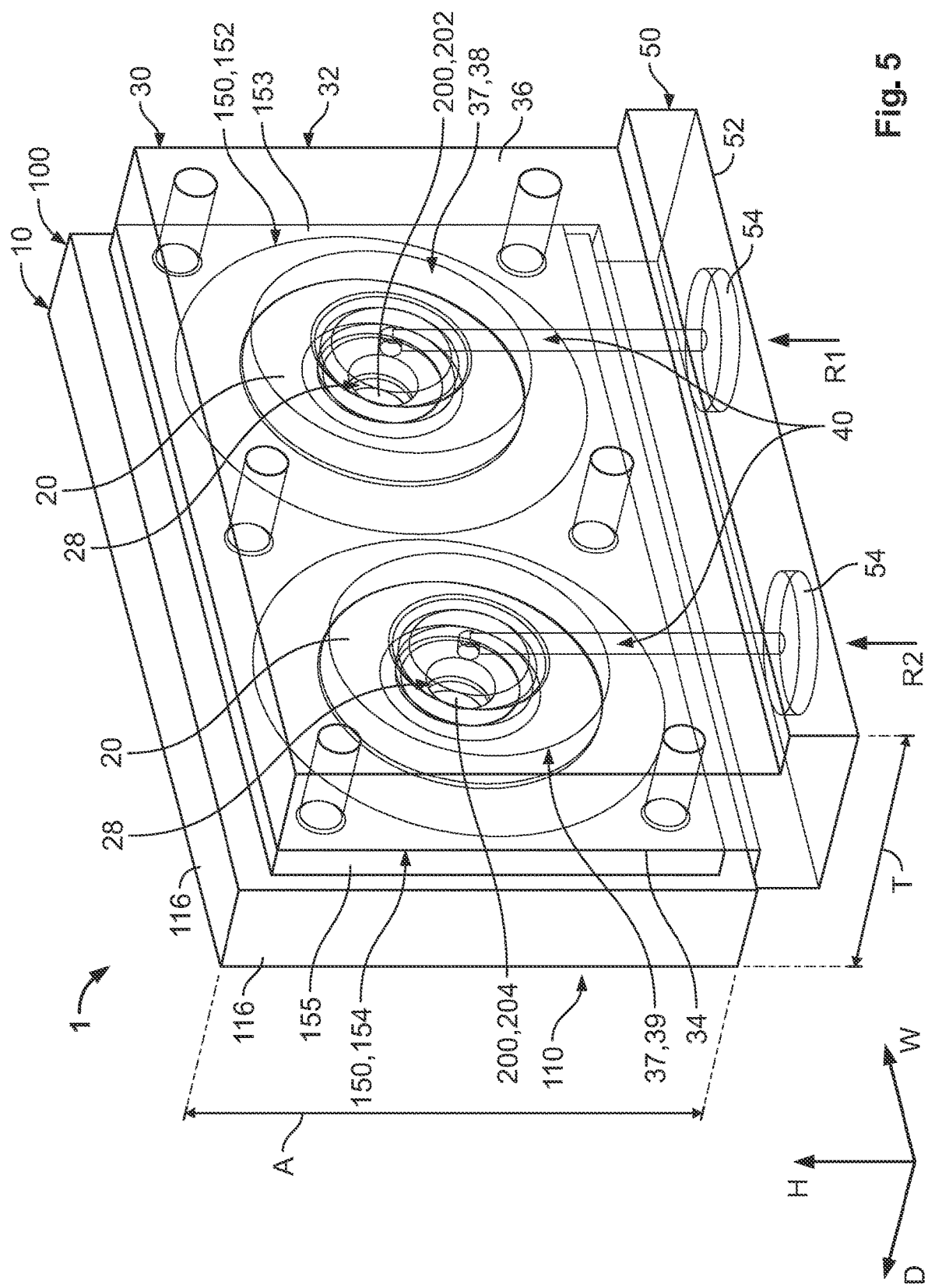
FIG. 5 is a partially transparent perspective view of the sensor assembly.

The sensor assembly 1 is shown assembled in FIGS. 1 and 5. In FIG. 5, the adapter 30 is transparent for ease of explanation of the various components of the sensor assembly 1 in the assembled state, but FIG. 5 is not meant to indicate that the adapter 30 has transparent material properties; the possible materials of the adapter 30 are described in detail above.

As shown in FIGS. 1 and 5, the base section 32 of the adapter 30 is connected to the housing 100. The interior surface 34 of the base section 32 abuts and is connected to the ports 150 of the housing 100 with the body seals 20 disposed between the sensor 10 and the adapter 30. The interior surface 34 may be welded to the ports 150 and the body seals 20. The exterior surface 36 of the adapter 30 faces away from the housing 100. The base section 32 is attached to the housing 100 with the end section 50 of the adapter 30 protruding beyond an end of the sensor 10 in the height direction H.

As shown in FIG. 5, each of the chambers 37 of the base section 32 is aligned with one of the ports 150 of the housing 100 in the depth direction D. The chambers 37 each face one of the body seals 20 and one of the diaphragms 200 disposed in one of the ports 150. The adapter passageways 40 each fluidly connect the mating face 52 to one of the chambers 37 and one of the central passageways 28 extending through one of the body seals 20, which connects the adapter passageway 40 with one of the ports 150 outside of the diaphragm 200 disposed in the port 150. The adapter passageways 40 fluidly connect the mating face 52 to the ports 150 of the housing 100.

In use of the sensor assembly 1, the mating face 52 is attached to a manifold or other surface through which a fluid medium, such as a liquid or gas, enters the adapter passageways 40 of the adapter 30 at the mating face 52 and is transmitted through the adapter passageways 40 and the central passageways 28 of the body seals 20 to the diaphragms 200.

In the attached orientation of the sensor assembly 1, the second plane P2 of the mating face 52 is perpendicular to the first plane P1 of the diaphragms 200. The sensor assembly 1 has an assembly thickness T extending in the depth direction D parallel to the second plane P2 of the mating face 52 and an assembly height A extending in the height direction H parallel to the first plane P1 of the diaphragms 200. The assembly height A is dictated largely by the diameter 208 of the diaphragms 200 shown in FIG. 2. The assembly thickness T is less than the assembly height A; in an embodiment, the diameter 208 of the diaphragms 200 is greater than 8 mm and the assembly thickness T is less than 8 mm. The sensor assembly 1 according to the present invention, by incorporating the adapter 30 with the adapter passageways 40, allows the diaphragms 200 to have a larger diameter 208 while maintaining a relatively smaller footprint of the sensor assembly 1 dictated by the assembly thickness T. The sensor assembly 1 permits the use of more sensitive diaphragms 200 in low pressure applications for improved performance in measuring the pressure of the fluid medium without exceeding a maximum permissible assembly thickness T of the sensor assembly 1.

During use of the sensor assembly 1 to measure pressure of the fluid medium, the sensor assembly 1 is exposed to, for example, a first pressure R1 and a second pressure R2. The first pressure R1 is transmitted through one of the adapter passageways 40, through the central passageway 28 of one of the body seals 20, and acts on the first diaphragm 202 in the first port 152. The first diaphragm 202 deflects in proportion with the first pressure R1 and correspondingly transmits the first pressure R1 to the oil 500 in the first cavity 162. The oil 500 in the first cavity 162 imparts the first pressure R1 on a first (lower) side of the first membrane 302 of the die 300 shown in FIG. 2. The second pressure R2 is transmitted through one of the adapter passageways 40, through the central passageway 28 of one of the body seals 20, and acts on the second diaphragm 204 in the second port 154. The second diaphragm 204 deflects in proportion with the second pressure R2 and correspondingly transmits the second pressure R2 to the oil 500 in the second cavity 164. The oil 500 in the second cavity 164 is connected to the main passageway 122 and the cavity passageways 130, as shown in FIG. 2; the oil 500 in each of these areas 122, 130, 164 is subject to the second pressure R2 by deflection of the second diaphragm 204. The oil 500 in the first cavity passageway 132 imparts the second pressure R2 on the second (upper) side of the first membrane 302 of the die 300.

The first membrane 302 of the sensing die 300, in the embodiment shown in FIG. 2, deflects according to a differential pressure between the first pressure R1 in the first cavity 162 and the second pressure R2 in the second cavity 164. Deflection of the first membrane 302 generates an electrical signal representative of the differential pressure on the opposite sides of the first membrane 302. The electrical signal can be output external from the sensor 10 though the pins 400 connected to the die 300. In another embodiment, the first membrane 302 of the sensing die 300 is only subject to the first pressure R1 in the first cavity 162 and has a vacuum or predetermined pressure acting on the opposite side of the first membrane 302, such that the first membrane 302 deflects according to an absolute measurement of the first pressure R1 in the first cavity 162. In another embodiment, the die 300 of the sensor 10 can have a second membrane in addition to the first membrane 302; the second membrane can measure the absolute pressure and may be monolithically formed in a single piece with the first membrane 302.

In the sensor assembly 1 shown in FIGS. 1-5, the sensor 10 has two ports 150, two cavities 160, and two diaphragms 200. Correspondingly, the sensor assembly 1 of the shown embodiment has two body seals 20 and the adapter 30 has two adapter passageways 40 communicating with the ports 150 through the body seals 20. In other embodiments, the sensor 10 could have one port 150 with one cavity 160 and one diaphragm 200 disposed in the port 150, and the sensor assembly 1 could correspondingly have one body seal 20 and one adapter passageway 40 in the adapter 30. In other embodiments, for example as described in the embodiment of FIG. 6 below, the sensor 10 may have three or more ports 150, cavities 160, and diaphragms 200, with a corresponding number of body seals 20 and adapter passageways 40 in the adapter 30. In the various embodiments of the sensor assembly 1, although the number of these components may change, the features described above are consistent and apply to each embodiment.

Figure 6:
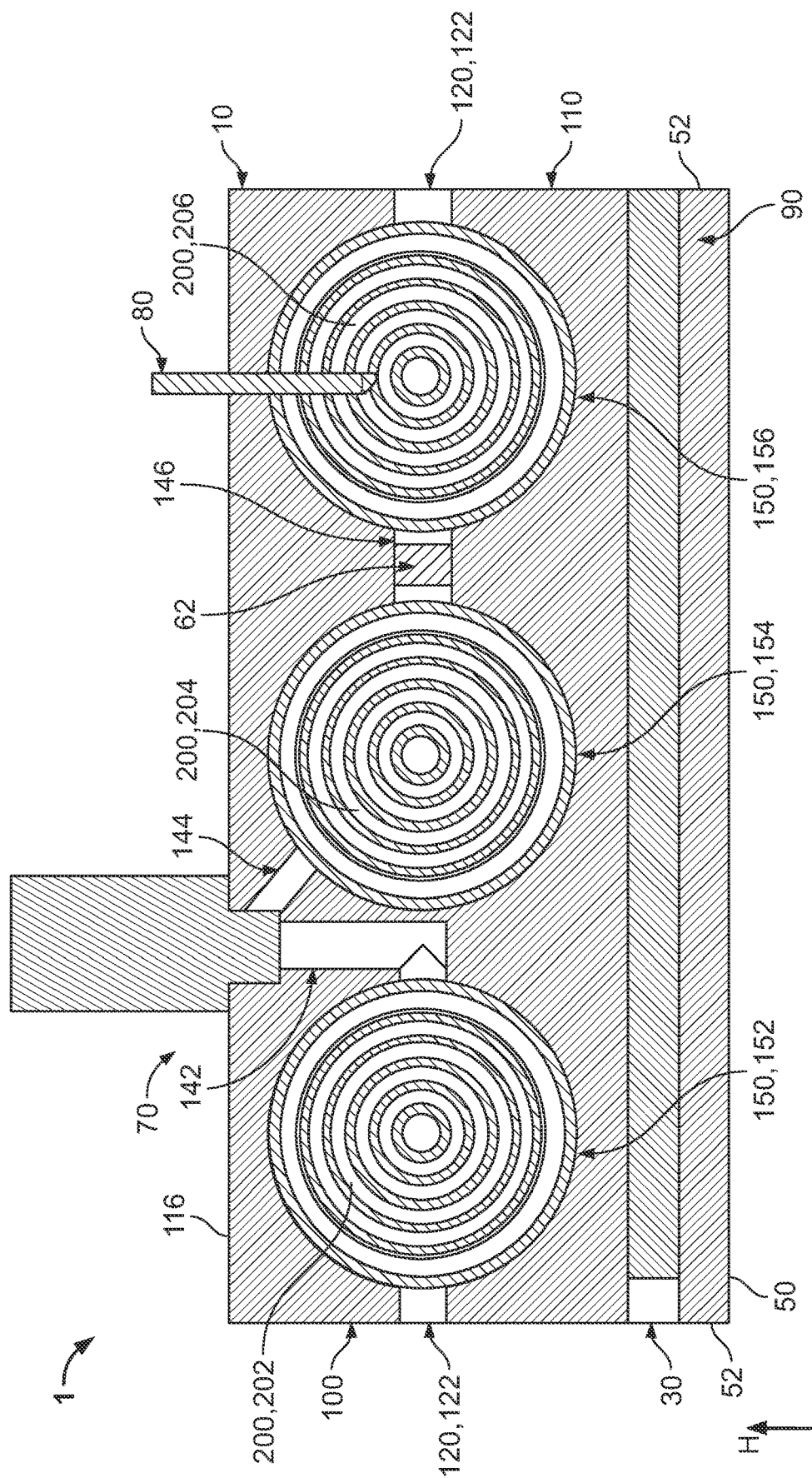
FIG. 6 is a sectional plan view of a sensor assembly according to another embodiment.

A sensor assembly 1 according to another embodiment is shown in FIG. 6. Like reference numbers refer to like elements and primarily the differences from the embodiment of the sensor assembly 1 shown in FIGS. 1-5 will be described in detail herein. The sensor assembly 1 may be used, for example, in a mass flow meter or a mass flow controller.

As shown in FIG. 6, the sensor 10 of this embodiment has a third diaphragm 206 in a third port 156 that encloses a third cavity. In this embodiment, the first diaphragm 202 in the first port 152 enclosing the first cavity 162 may contain a die having a membrane deflectable to measure an absolute pressure. The second diaphragm 204 and the third diaphragm 206 in the second port 154 and the third port 156 respectively enclose the second cavity 164 and the third cavity that each contain a die having a membrane deflectable to measure a differential pressure.

In the embodiment shown in FIG. 6, the sensor assembly 1 includes a valve 70 attached to one of the sidewalls 116 of the body 110 and communicating with the passageways 120 in the body 110 of the housing 100. The valve 70 is controllable to regulate a flow of a fluid medium into the passageways 120 and ports 150 of the housing 100.

The passageways 120 of the housing 100 include a first valve passageway 142, a second valve passageway 144, and a laminar passageway 146 extending through the body 110. The first valve passageway 142 connects the valve 70 to the first port 152. The second valve passageway 144 connects the valve 70 to the second port 154. The laminar passageway 146 connects the second port 154 to the third port 156. In the embodiment shown in FIG. 6, the end section 50 can have a pair of mating faces 52 positioned at opposite ends of the end section 50 in the width direction W.

The sensor assembly 1 of FIG. 6 includes a laminar flow element 62 disposed in the laminar passageway 146. The valve 70 allows the fluid medium into the second valve passageway 144 and, after the fluid medium passes through the second port 154, the laminar flow element 62 divides the flow of the fluid medium such that the differential pressure measured by the die in the second port 154 is different from the differential pressure measured by the die in the third port 156. The laminar flow element 62 may be any type of laminar flow element used in mass flow measurement and control applications.

The sensor assembly 1 of FIG. 6 includes a temperature probe 80 measuring a temperature of the fluid medium in the third port 156 and a heating element 90 disposed between the end section 50 of the adapter 30 and the housing 110. The heating element 90, such as a heater cartridge or any other type of heating element used to control temperature of a fluid or gas, receives a temperature signal from the temperature probe 80 and activates to maintain the temperature of the fluid medium in the third port 156 to be approximately equal to the temperature of the fluid medium in the second port 154. Maintaining the temperature in this manner allows for a more accurate measurement of the fluid medium in high temperature gas applications.

What is claimed is:

1. A sensor assembly, comprising:
   a sensor including a housing having a port and a cavity, a diaphragm disposed in the port and enclosing the cavity, and a sensing die disposed in the cavity enclosed by the diaphragm, wherein the diaphragm extends in a first plane; and
   an adapter having a base section connected to the housing and an end section extending from the base section, wherein the end section has a mating face that extends in a second plane perpendicular to the first plane, and the adapter has an adapter passageway extending from the mating face through the base section of the adapter that connects the mating face to the port of the housing.

2. The sensor assembly of claim 1, wherein the housing has a body with a first face and a second face opposite the first face, the port extends from the first face.

3. The sensor assembly of claim 2, wherein the base section has an interior surface connected to the port of the housing and an exterior surface facing away from the housing, the adapter passageway extends into the interior surface.

4. The sensor assembly of claim 3, wherein the adapter passageway has a first portion extending from the interior surface in a first direction parallel to the second plane and a second portion extending from the first portion to the mating face, the second portion is perpendicular to the first portion.

5. The sensor assembly of claim 3, wherein the base section has a chamber extending into the interior surface and facing the diaphragm, the adapter passageway ends in the chamber.

6. The sensor assembly of claim 1, wherein the mating face has a recess extending into the mating face, the adapter passageway ends in the recess of the mating face.

7. The sensor assembly of claim 6, further comprising an adapter seal disposed in the recess, the adapter seal is an elastomeric material or a metal material.

8. The sensor assembly of claim 1, wherein the diaphragm is connected to the housing by a weld.

9. The sensor assembly of claim 1, further comprising a body seal disposed between the sensor and the adapter.

10. The sensor assembly of claim 9, wherein the body seal is disposed in the port on a side of the diaphragm opposite the cavity.

11. The sensor assembly of claim 10, wherein the body seal is connected to the housing and the adapter by a weld.

12. The sensor assembly of claim 11, wherein the housing, the adapter, and the body seal are each formed of a metal material.

13. The sensor assembly of claim 10, wherein the body seal has a central passageway extending through the body seal and connecting the adapter passageway with the port.

14. The sensor assembly of claim 1, wherein the sensor assembly has an assembly thickness in a direction parallel to the second plane that is less than an assembly height in a direction parallel to the first plane.

15. The sensor assembly of claim 1, wherein the die has a membrane that is deflectable according to a pressure in the cavity.

16. The sensor assembly of claim 15, wherein the port is a first port, the cavity is a first cavity, and the diaphragm is a first diaphragm of the sensor, the sensor includes a second port, a second cavity, and a second diaphragm disposed in the second port and enclosing the second cavity.

17. The sensor assembly of claim 16, wherein the membrane is deflectable according to a differential pressure between a first pressure in the first cavity and a second pressure in the second cavity.

18. The sensor assembly of claim 16, wherein the housing has a laminar passageway connecting the first port and the second port, and further comprising a laminar flow element disposed in the laminar passageway.

19. The sensor assembly of claim 1, further comprising a valve connected to the housing and regulating a flow of a fluid medium into the port.

20. The sensor assembly of claim 1, further comprising a heating element disposed between the end section of the adapter and the housing, and a temperature sensor measuring a temperature of a fluid medium in the port.

21. The sensor assembly of claim 1, wherein the mating face is one of a pair of mating faces on a pair of opposing ends of the adapter.

* * * * *